(12) United States Patent
Suchowski et al.

(10) Patent No.: US 6,415,741 B2
(45) Date of Patent: *Jul. 9, 2002

(54) SCENTED CHEW TOY (75) Inventors: Bernard Suchowski, Marlboro, NJ (US); Simon Handelsman, Newburyport, MA (US); J. C. Lai, Taipei (TW)

(73) Assignee: The Hartz Mountain Corporation, Secaucus, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/852,450

(22) Filed: May 9, 2001

Related U.S. Application Data (63) Continuation-in-part of application No. 09/630,355, filed on Aug. 1, 2000, which is a continuation-in-part of application No. 09/122,228, filed on Jul. 24, 1998, now Pat. No. 6,116,191, application No. 09/852,450, which is a continuation-in-part of application No. 09/560,010, filed on Apr. 27, 2000, now Pat. No. 6,305,326, which is a continuation of application No. 09/122,228.

(51) Int. Cl.[7] ............................................. A01K 29/00
(52) U.S. Cl. ....................................... 119/711; 119/709
(58) Field of Search ................................ 119/709, 707, 119/710, 702, 711; D30/160

(56) References Cited

U.S. PATENT DOCUMENTS

| | | | |
|---|---|---|---|
| 2,003,958 A | | 6/1935 | Salisbury |
| 3,871,334 A | | 3/1975 | Axelrod |
| 4,513,014 A | * | 4/1985 | Edwards ..................... 426/132 |
| 4,674,444 A | * | 6/1987 | Axelrod ...................... 119/709 |
| 4,771,733 A | | 9/1988 | Axelrod |
| 4,802,444 A | | 2/1989 | Markham et al. |
| 4,919,083 A | | 4/1990 | Axelrod |
| 4,924,811 A | | 5/1990 | Axelrod |
| 4,928,632 A | * | 5/1990 | Gordan ....................... 119/709 |
| D320,495 S | | 10/1991 | Pallesen |
| 5,148,770 A | * | 9/1992 | O'Rourke ................... 119/709 |
| 5,174,243 A | | 12/1992 | O'Rourke |
| 5,200,212 A | | 4/1993 | Axelrod |
| D337,398 S | | 7/1993 | Axelrod |
| 5,263,436 A | * | 11/1993 | Axelrod ...................... 119/709 |
| D343,262 S | | 1/1994 | Axelrod |
| 5,339,771 A | * | 8/1994 | Axelrod ...................... 119/709 |
| D357,952 S | | 5/1995 | Chen |
| D358,007 S | | 5/1995 | Axelrod |
| 5,419,283 A | | 5/1995 | Leo |
| 5,476,069 A | | 12/1995 | Axelrod |
| 5,485,809 A | | 1/1996 | Carroll |
| 5,595,142 A | | 1/1997 | Chill |
| D384,985 S | | 10/1997 | Cronic |
| 5,832,877 A | | 11/1998 | Markham |
| 5,857,431 A | | 1/1999 | Peterson |
| 5,912,285 A | | 6/1999 | Godsey |
| 5,941,197 A | | 8/1999 | Axelrod |
| 5,947,061 A | | 9/1999 | Markham et al. |
| 6,067,941 A | * | 5/2000 | Axelrod ...................... 119/709 |
| 6,112,703 A | * | 9/2000 | Handelsman ............... 119/709 |
| 6,116,191 A | * | 9/2000 | Suchchowski et al. ...... 119/709 |
| 6,305,326 B1 | * | 10/2001 | Suchchowski et al. ...... 119/709 |

* cited by examiner

Primary Examiner—Charles T. Jordan
Assistant Examiner—Judith A. Nelson
(74) Attorney, Agent, or Firm—Stroock & Stroock & Lavan LLP (57) ABSTRACT

A synthetic chew toy can be formed as a composite of two different materials. The toy can be formed with a rigid synthetic frame, supporting a softer chew portion. The chew portion can include a plurality of projections, preferably having a cylindrical shape with a hemispheric end, extending outward from a base of the chew portion. Thus, the rigidity of the frame provides structure, support and durability for the chew toy, and the relatively softer chew portion can provide beneficial effects to a pets teeth and gums, or provide greater chewing pleasure. A scent insert can be housed within the frame and scent can be emitted through passageways through the chew portion and frame.

22 Claims, 7 Drawing Sheets

SCENTED CHEW TOY

CROSS-REFERENCE TO RELATED APPLICATIONS

This application claims priority as a continuation-in-part of pending application Ser. No. 09/630,355, filed Aug. 1, 2000, which itself is a continuation-in-part of application Ser. No. 09/122,228, filed Jul. 24, 1998, now U.S. Pat. No. 6,116,191, issued Sep. 12, 2000. This application also claims priority as a continuation-in-part of pending Ser. No. 09/560, 010, filed Apr. 27, 2000 now U.S. Pat. No. 6,305,326, which itself is a continuation of Ser. No. 09/122,228, filed Jul. 24, 1998, U.S. Pat. No. 6,116,191. The contents of these applications are incorporated herein by reference.

BACKGROUND OF THE INVENTION

The invention relates generally to chew toys for pets and more particularly to a chew toy having a therapeutic effect on a dog's teeth and gums.

Various products exist in the market which are intended to clean a pet's teeth as the pet chews the product or to satisfy a pet's chewing urge. One type of product is an edible chew toy, made of materials such as rawhide, which is extremely hard and therefore unacceptable for certain older dogs or dogs with tooth problems. Other chew toys are formed of soft rubber materials and can exhibit unsatisfactorily high flexibility and/or unsatisfactory low durability. Other plastic products are molded from hard materials and can expose the inside of a dogs mouth to undesirably hard or sharp product. An example of a chew toy formed of a uniform synthetic material is disclosed in U.S. Pat. No. 5,263,436, the contents of which are incorporated herein by reference.

It is often desirable to impart scent or flavor into a pet chew toy. For example, U.S. Pat. Nos. 4,513,014 and 3,871, 334, the contents of which are incorporated herein by reference, describe adding flavor additives to a synthetic molded chew toy, either before or after the chew toy is molded. With such a construction, the flavor or scent materials are present at the surface of the toy and can come off on ones hands when the toy is handled.

Accordingly, it is desirable to provide a synthetic chew toy for a pet, such as a dog, which overcomes shortcomings of existing chew toys.

SUMMARY OF THE INVENTION

Generally speaking, in accordance with the invention, a synthetic chew toy formed as a composite of two different materials is provided in which a flavor or scent (hereinafter scent) impregnated insert is located within the interior of the toy and is emitted through holes or channels formed in the toy body. The toy can be formed with a rigid synthetic frame, supporting a softer chew portion. The chew portion can include a plurality of projections, preferably having a cylindrical shape with a hemispheric end, extending outward from a base of the chew portion. Thus, the rigidity of the frame provides structure, support and durability for the chew toy, and the relatively softer chew portion can provide beneficial effects to a pet's teeth and gums, or stimulate greater chewing. By locating a scent module within the body of the toy, less of the scent is likely to get on one's hands when the toy is handled.

Accordingly, it is an object of the invention to provide an improved chew toy for pets, such as dogs.

Another object of the invention is to provide a chew toy for pets, having high durability.

Yet another object of the invention is to provide a chew toy for pets, having acceptable softness and flexibility.

Still another object of the invention is to provide a scented chew toy in which less of the scent will be transferred to one's hands when the toy is handled.

Still other objects and advantages of the invention will in part be obvious and will in part be apparent from the specification and drawings.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

A chew toy constructed in accordance with an embodiment of the invention is shown generally in FIGS. 1–4 as composite bone 100 and is formed with a frame 200 supporting a soft portion 300. Frame 200 includes four bulbous portions 210 at the ends thereof, to simulate a bone shape. Frame 200 also includes a support shelf 220 having an inner wall 225 defining an opening 226 in the shape of an elongated oval. Frame 200 also includes a support wall 230 surrounding and perpendicular to shelf 220, such that shelf 220 extends inward and perpendicular to an inner wall 231 of support wall 230.

Frame 200 is preferably highly rigid and provides composite bone 100 with its rigidity and durability. Frame 200 also provides composite bone 100 with a portion to simulate the hard portion of a natural bone. Frame 200 is preferably formed from a rigid, durable, non-toxic material, such as various rigid thermoplastic and thermosetting materials, such as various polymers and resins, preferably, nylon, most preferably 6–6 nylon. Frame portion 200 is advantageously molded to have a hardness in the range of 70 to 90, preferably 82–89, most preferably 85 Shore D hardness (Scale Shore D).

In the non-limiting embodiment exemplified by FIGS. 1–4, frame 200 is injection molded and then cooled to obtain maximum shrinkage. Thereafter, frame 200 is placed into the cavity of a second mold and the material for soft portion 300 is injection molded within the confines of the second mold and frame 200.

Figure 3:
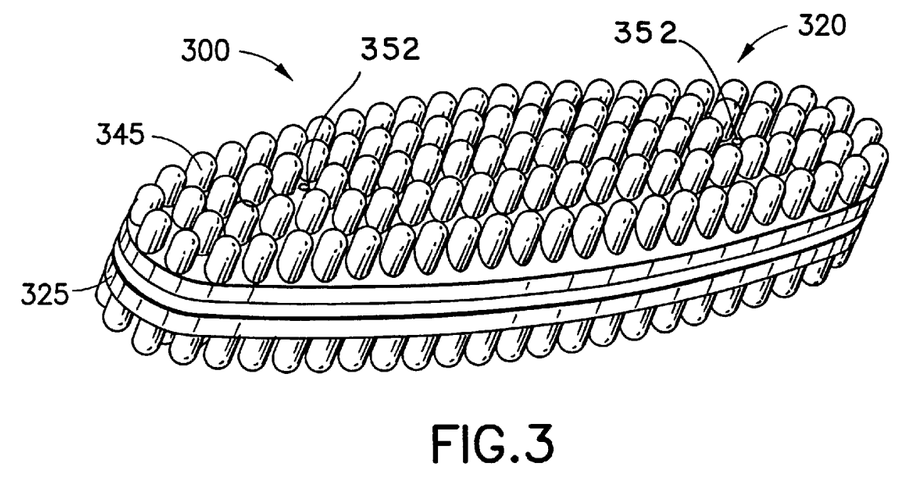
FIG. 3 is a perspective view of a soft portion of the chew toy of FIG. 1.
Figure 4:
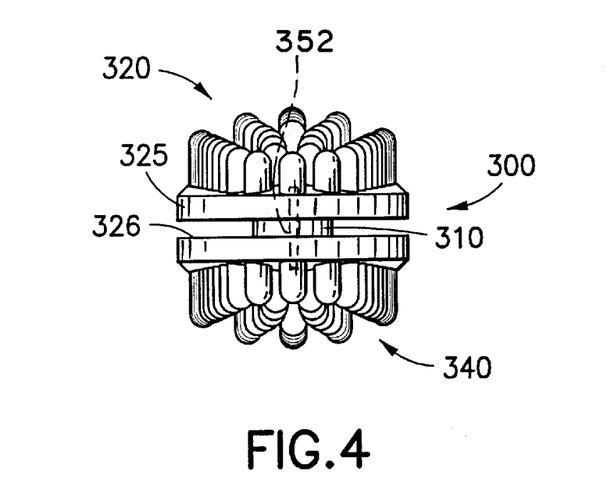
FIG. 4 is an end view of the soft portion of FIG. 3.
Figure 5:
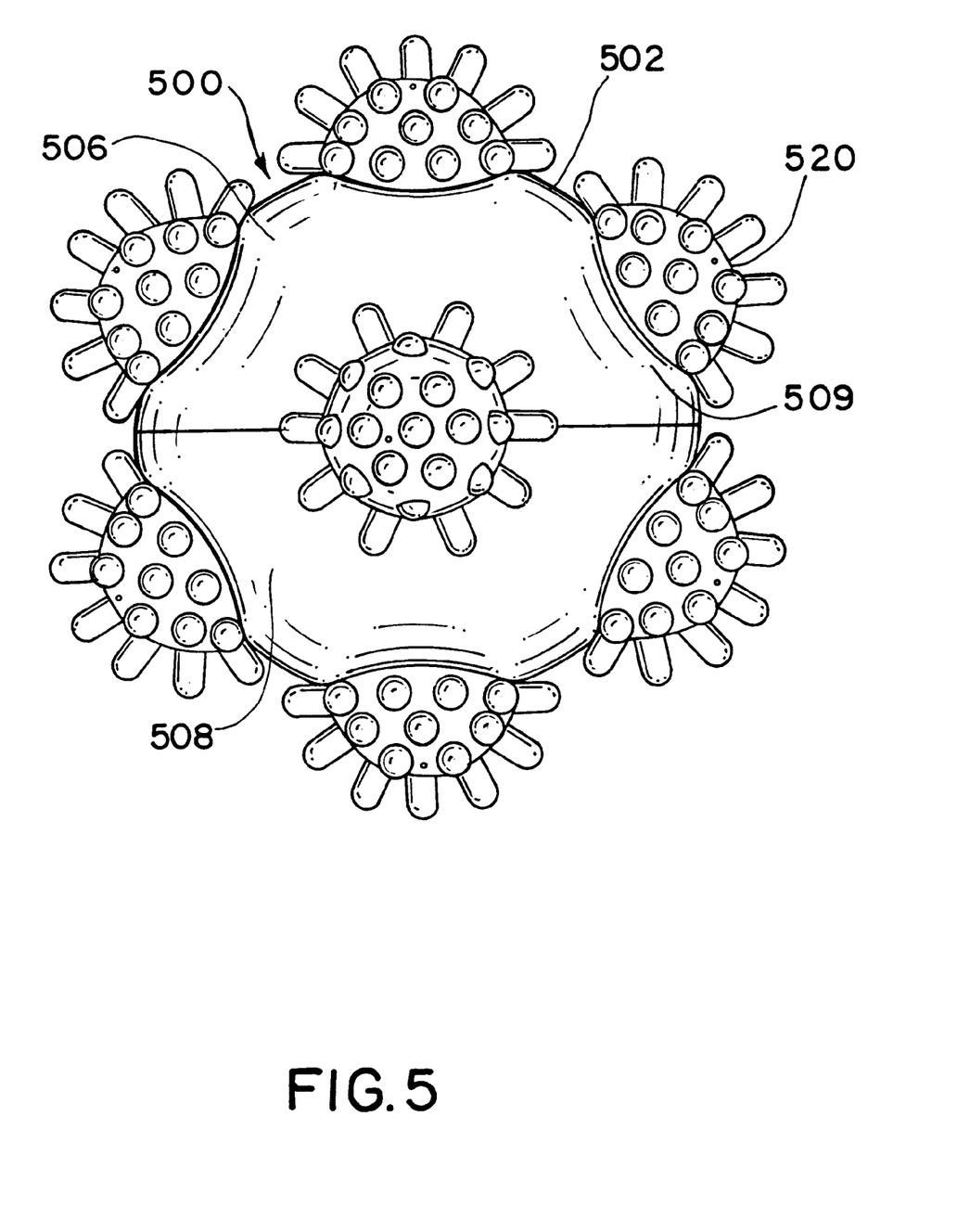
FIG. 5 is a plan view of a chew toy constructed in accordance with another embodiment of the invention.

Soft portion 300 is formed of material which is considerably softer and more flexible than the material used to form frame 200. Referring to FIGS. 3 and 4, it can be seen that soft portion 300 includes a base 310 which fills the opening 226 defined by inner wall 225. Soft portion 300 also includes a pair of chew surfaces 320 having a pair of annular wings 325 having facing surfaces 326 which extend perpendicularly from base 310. Wings 325 fill the space defined by inner walls 231 and shelves 220 and extend perpendicular to and outward from walls 220 to form a pair of domes 340.

Each dome 340 supports a plurality of projections 345 which extend perpendicular to and in the opposite direction from facing surfaces 326. Projections 345 have a generally cylindrical shape and a hemispheric top, which presents a smooth contact surface for a dog's teeth and gums. The cylindrical shape can also enhance the ability of projections 345 to extend deep into spaces between a dog's teeth. It is believed that the combination of soft and hard portions and/or flexible projections, more closely simulate the plurality of textures encountered when chewing a natural bone containing bone, meat and gristle, and can stimulate chewing activity. The chew toy should be made of appropriate materials so as not to injure a dog or be damaged when a dog begins to chew on the toy.

Although various resilient polymers can be used as the material to construct soft portion 300, a preferred material is polyurethane. Other natural and synthetic rubbers are also acceptable. Soft portion 300 should be molded to have a hardness in the range of 70 to 90, preferably 80–90, most preferably 85 Shore A hardness (Scale Shore A) as measured in a durameter. The materials, weight, hardness and construction of chew toys in accordance with the invention should be appropriate for use as a dog chew toy.

Bone 100 can be formed of an assortment of additional materials, including ABS, PVC, polycarbonate and rubber. In one embodiment of the invention, scent and flavor additives such as cheese, beef, pork, chocolate and so on can be compounded with the material for forming frame 200 or soft portion 300 before they are molded.

In another embodiment of the invention, the scent additive is combined with a module or insert which is housed within frame 200 of bone 100. This can reduce the presence of the scent material at the surface of the toy.

Figure 1:
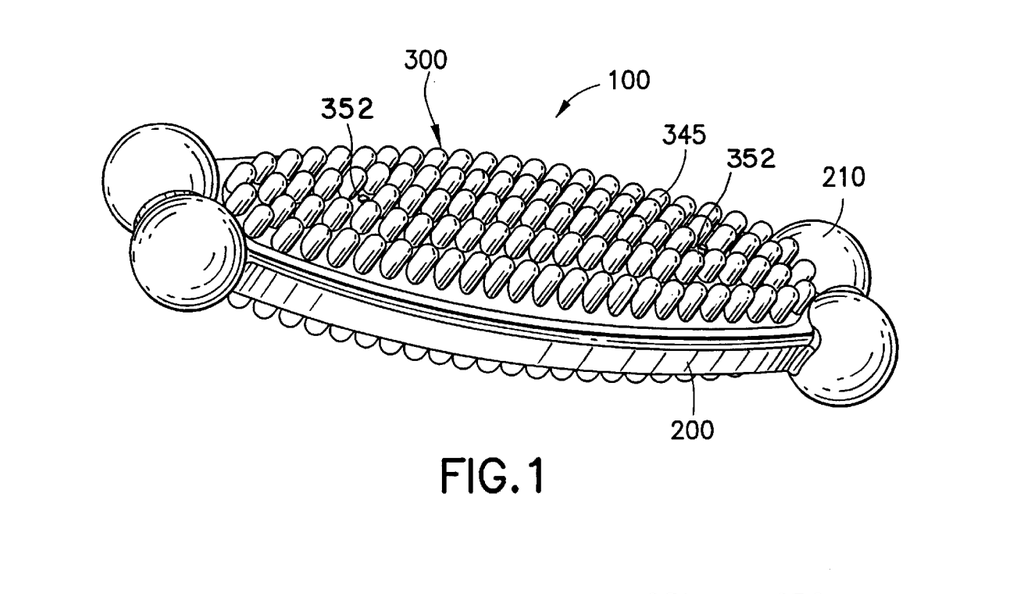
FIG. 1 is a perspective view of a chew toy constructed in accordance with an embodiment of the invention.
Figure 2:
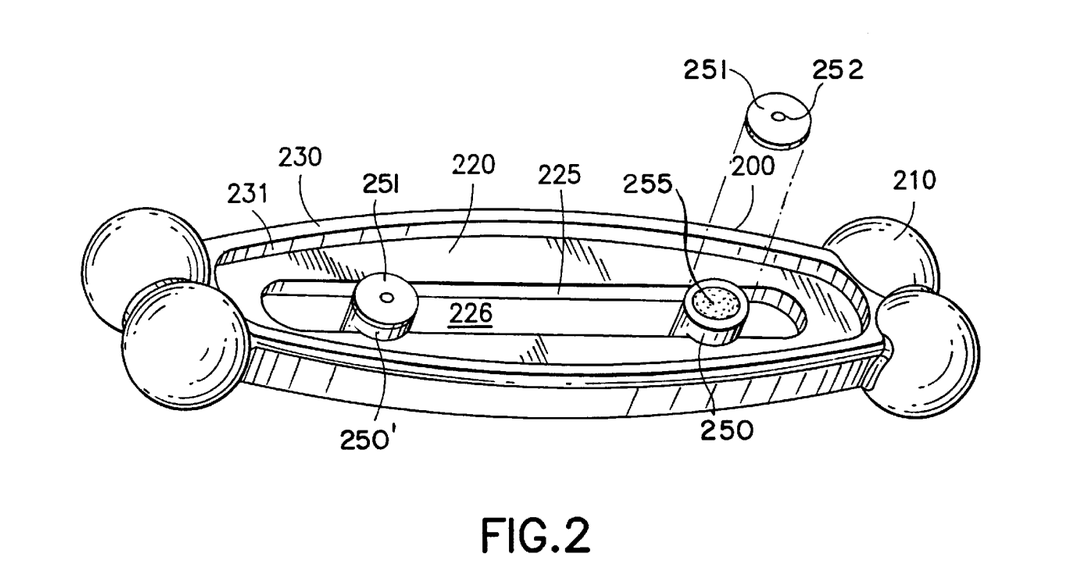
FIG. 2 is a perspective view of a frame portion of the chew toy of FIG. 1.

Referring to FIG. 2, frame 200 includes a container portion 250 which houses a flavor insert 255. In a preferred embodiment of the invention, container 250 is molded unitary with the remainder of frame 200. Insert 255 is advantageously a sponge-like body of open cell foam which is advantageously inert to the scent material.

In one embodiment of the invention, frame 200, including container 250, is molded, foam insert 255 is installed within container 250 and a cap 251 having a hole 252 therethrough is installed over insert 255. The bottom of container 250 can have the same construction as cap 251, with a hold therethrough, but is advantageously formed unitary with container 250. Alternatively, container 250 can be symmetrical and caps can be fixed at both sides. After insert 255 is placed within container 250 and cap 251 is secured thereto, a completed container 250' is formed.

After completed insert containing capped container 250' is assembled, soft portion 300 can be molded or otherwise mounted in place on frame 200. Soft portion 300 is advantageously provided with a pair of channels (passageways or through holes) 352 which line up with hole 252 of cap 251 and/or a similarly configured hole at the bottom of container 250. Through holes 352 can either be molded in place or formed thereafter, such or with a needle.

In one embodiment of the invention, after soft portion 300 is formed over frame 200, an injector needle can be inserted through soft portion 300, thereby forming hole 352 or through a performed hole 352, into insert 255. A portion of scent emitting material can then be injected into insert 255. The scent will then be emitted through hole 352, without being generally distributed throughout or on the surface of soft portion 300.

With reference to FIGS. 5–10, there is shown a synthetic chew toy 500 in accordance with another embodiment of the invention. In general, chew toy 500 is provided with a substantially spherical frame 502 molded to have a plurality of apertures 504 (shown in FIG. 6) to receive a plurality of studs 520. Frame 502 is formed of a rigid, durable, non-toxic material as described above with reference to frame 200. Studs 520 are preferably formed from a second material which is considerably softer and more flexible than the material of frame 502, as described above in reference to soft portion 300. Toy 500 is sized and weighted to be held in the mouth of a dog.

Figure 6:
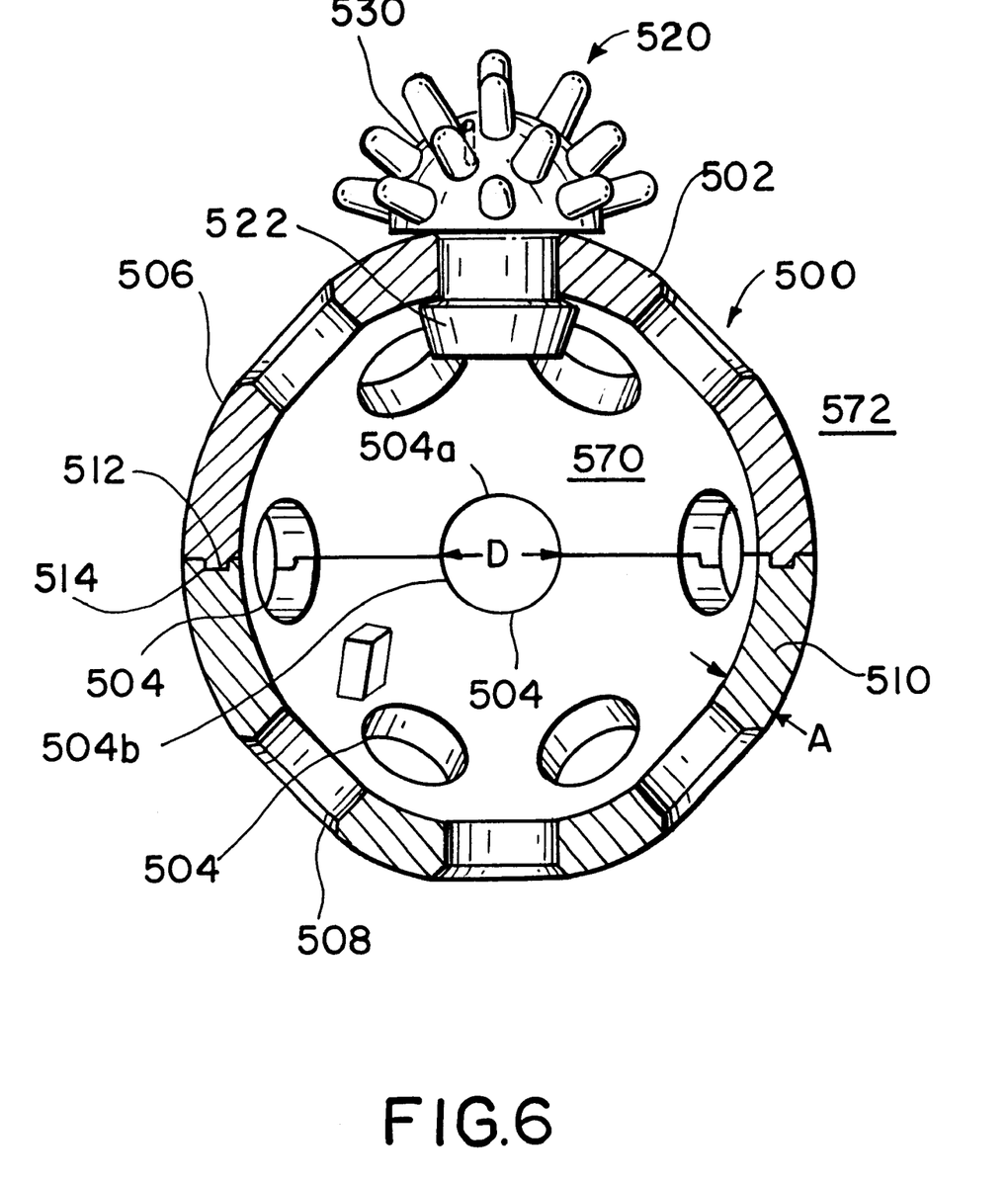
FIG. 6 is a cross-sectional view of the chew toy of FIG. 5.

The frame 502 is preferably injection molded in two halves 506, 508 which are then joined together. With further reference to FIG. 6, male half 506 is preferably molded with a protrusion 512 and female half 508 is molded with a groove 514. Protrusion 512 of male half 506 is matingly engaged with groove 514 of female half 508. Protrusion 512 and groove 514 are preferably annular, each following the circumference of each of respective halves 506, 508. Also, protrusion 512 and groove 514 can be either continuous, making a full, continuous path around the circumference of each of the respective halves 506, 508, or discontinuous, in the form of several protrusions 512 and corresponding grooves 514, as is shown in FIG. 6, where protrusion 512 and groove 514 are discontinuous, being broken by the cutouts for the apertures 504 in frame 502. Halves 506, 508 may be molded such that apertures 504 are centered on the seam between the male half 506 and the female half 508, with a first portion 504a of an aperture being formed in male half 506, and a second portion 504b being formed in female half 508. The first portion of an aperture 504a, can be described as an aperture 504a on the male half 506, in which aperture 504a is only partially encircled by male half 506. Likewise, the second portion of an aperture 504b, can be described as an aperture 504b on female half 508, in which aperture 504b is only partially encircled by female half 508. When male half 506 and female half 508 are joined, first portion 504a and second portion 504b are aligned to form a single aperture 504 which is fully encircled by frame 502. With halves 506, 508 formed in this manner, protrusion 512 and groove 514 are discontinuous, as discussed above.

The frame 502 is further advantageously sealed by ultrasonically sealing, halves 506, 508, such that an integral frame 502 is formed, with the halves 506, 508 being fused into a single integral unit. Alternatively, other techniques known to those skilled in the art can be used to seal together halves 506, 508.

Figure 10:
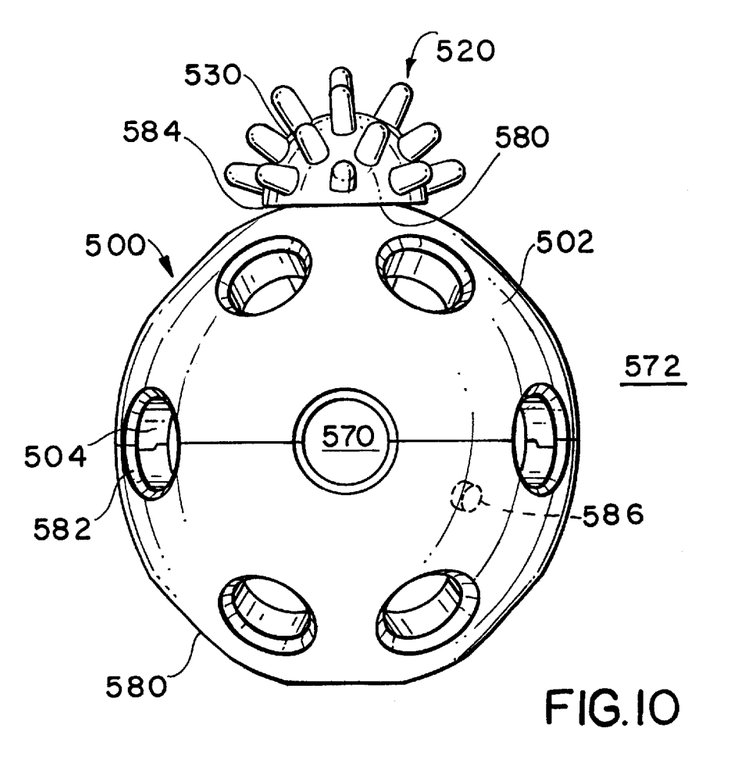
FIG. 10 is a plan view of an alternative embodiment of a frame of a chew toy of FIG. 5.

Turning to FIG. 10, frame 502, having apertures 504, of chew toy 500 is shown, with frame 502 having a substantially spherical shape. Frame 502 need not be substantially spherical in shape, however, and can have one of a variety of shapes, such as, for example, an elongated football shape, or a substantially cylindrical or tubular shape. Further, in an alternate embodiment of the invention, while being substantially spherical, frame 502 can have a plurality of flat portions 580, on surface 509, encircling each of the apertures 504. Also, apertures 504 may be formed with chamfered edges 582. Flat portions 580 and chamfered edges 582 facilitate stable retention of studs 520, as will be discussed below.

Referring again to FIG. 6, there is shown a cross-section of a preferred embodiment of the present invention with the halves 506, 508 sealed together. As shown, frame 502 is preferably hollow to permit studs 520 to be anchored into place. Thus, hollow frame 502 defines an interior volume 570, separated from ambient atmosphere 572. Frame wall 510 has a thickness A, which may depend upon the size of the ball, the type of studs, or the chewing power of the dog for which the toy is intended. Also, halves 506, 508 need not be hollow, and may be formed as solid, non-hollow pieces. Apertures 504 could then be formed in solid halves 506, 508, either before, or after halves 506, 508 are joined together. Further, the frame need not be formed from two halves, but could be molded or formed from a single piece, or from three or more pieces.

Apertures 504 in frame 502 may be formed during the molding or forming process of halves 506, 508. Alternatively, some or all of the apertures 504 may be formed in a second step by, for example, drilling or cutting the apertures in previously formed halves 506, 508. In a preferred embodiment, at least a part of an aperture 504 is molded on each half 506, 508, then, in a subsequent step, at least one aperture 504 is drilled in the frame.

Figure 7:
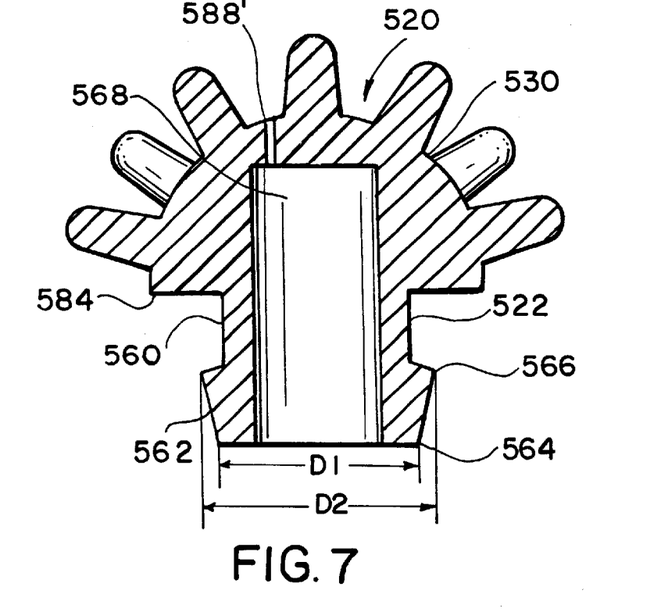
FIG. 7 is a cross-sectional view of a first embodiment of a stud for use with the chew toy of FIG. 5.

A first embodiment of a stud 520 for use with the present invention is shown in FIG. 6. Stud 520 is generally round when viewed from the top or bottom, although the particular shape of stud 520 is not critical. Stud 520 has a securing member 522 and a chew portion 530. Securing member 522 is insertable into aperture 504 of frame 502 so as to secure stud 520 to the frame 502. With further reference to FIG. 7, securing member 522 generally includes a stem 560 and an anchor 562. Anchor 562 is tapered inwardly toward a first end 564 of stud 520. In a preferred embodiment of the invention, a first end 564 of anchor 562 has a first diameter D1 that is substantially the same or less than the diameter D (FIG. 6) of aperture 504 of frame 502.

Furthermore, a second end 566 of anchor 562 must have a diameter D2 that is greater than the diameter D of aperture 504 of frame 502. As such, upon insertion of securing member 522 of stud 520 into aperture 504, as shown in FIG. 6, stud 520 will be anchored into frame 502 due to the larger diameter D2 of second end 566. As will be described below, the inward taper of anchor 562 facilitates insertion of stud 520 into aperture 504.

Referring again to FIG. 7, in a preferred embodiment of the invention, a substantially cylindrical hollow 568 is preferably formed through at least a portion of stud 520. Hollow 568 is preferably concentric with anchor 562. In use, hollow 568 facilitates the temporary inward deflection or deformation of anchor 562 so that stud 520 may be press fit into aperture 504. When stud 520 is inserted into aperture 504, first end 564, and then second end 566 of anchor 562, pass through aperture 504. The inward taper of anchor 562 and the hollow 568 facilitate the temporary deformation of anchor 562 during the insertion process. This can also be aided by forming slots in anchor 562. Since anchor 562 is formed of a resilient material, its deformation will only be temporary, and after the insertion process, the anchor 562 will return to its original, or substantially its original, shape.

Preferably, the stud 520 is unitarily formed of a single material. It should also be noted, however, that the chew portion 530, the securing member 522 and anchor 562 need not be formed of the same material, and may be formed of materials with differing hardness and resiliency characteristics.

Figure 8:
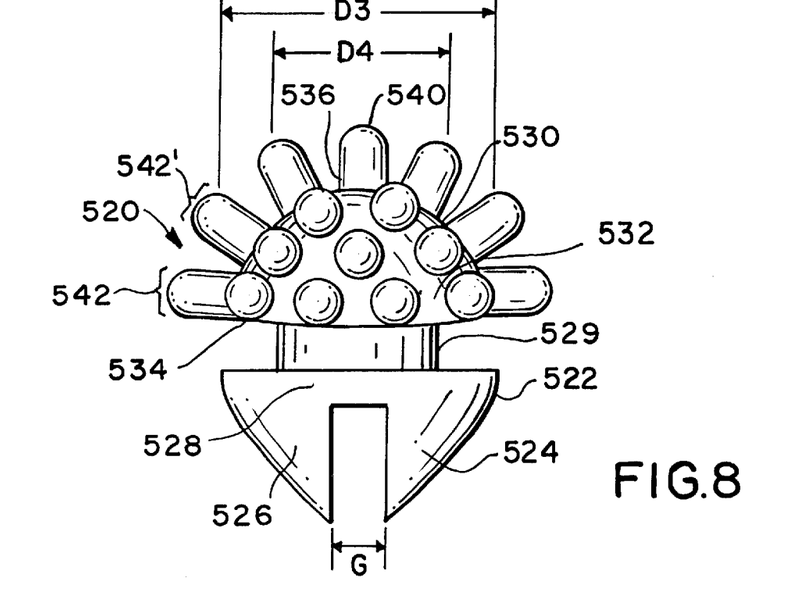
FIG. 8 is a plan view of another embodiment of a stud for use with the chew toy of FIG. 5.

A stud 520, for use with chew toy 500 in accordance with another embodiment of the invention is shown in FIG. 8. Securing member 522 has a pair of split arms 524, 526 which extend from a base 528 of securing member 522. Arms 524, 526 are separated by a gap G to permit the arms 524, 526 to be inwardly deflectable. As securing member 522 is inserted into aperture 504, arms 524, 526 deflect inward causing base 528 to bend inwardly. This inward deflection permits stud 520 to be inserted into aperture 504. Since securing member 522 and arms 524, 526 are formed of a resilient material, the inward deflection of the arms 524, 526 will only be temporary, and after the insertion process, securing member 522 and arms 524, 526 will return to their original, or substantially their original, shape. Because the diameter D3 of base 528 is larger than the diameter D of the aperture 504, the inserted base 528 will anchor stud 520 the frame 502.

Base 528 in turn is connected to stem 529. The diameter D3 of base 528 is preferable wider than the diameter D of the aperture 504 (as shown in FIG. 6), so as to prevent the stud 520 from being dislodged. The stem 529, which is narrower than the diameter D3 of base 528, has a diameter D4 that is preferably the same or slightly wider than diameter D of the aperture 504 so as to create a tight fit. Also, the diameter D4 of stem 529 could be less than diameter D of aperture 504. A tight fit is preferable, however, because it will limit the amount of movement in the stud 520.

Securing member 522 is connected to chew portion 530 which lies exposed in the ambient atmosphere 572 outside of frame 502. It is preferable that the securing member 522 and the chew portion 530 are integrally formed to increase the strength and resiliency of the studs 520.

As shown in FIG. 7, chew portion 530, formed on both embodiments of the stud 520, is preferably hemispherical with a plurality of projections 540 extending from the surface 532 of the chew portion 530. The projections 540 are preferably arranged concentrically in bands 542, 542' of decreasing diameters, which begin at a base 534 and end at an apex 5:36 of the chew portion 530. Alternatively, the projections 540 may be disposed in a different, more random configuration than the concentric band arrangement. Furthermore, chew portion 530 is preferably constructed to overlap a portion of the frame 502 that immediately surrounds the aperture 504.

The overall shape and size of the chew portion 530 and the projections 540 may be modified as the particular application requires. For example, the projections 540 may be formed to extend in between the teeth of a dog.

Figure 9:
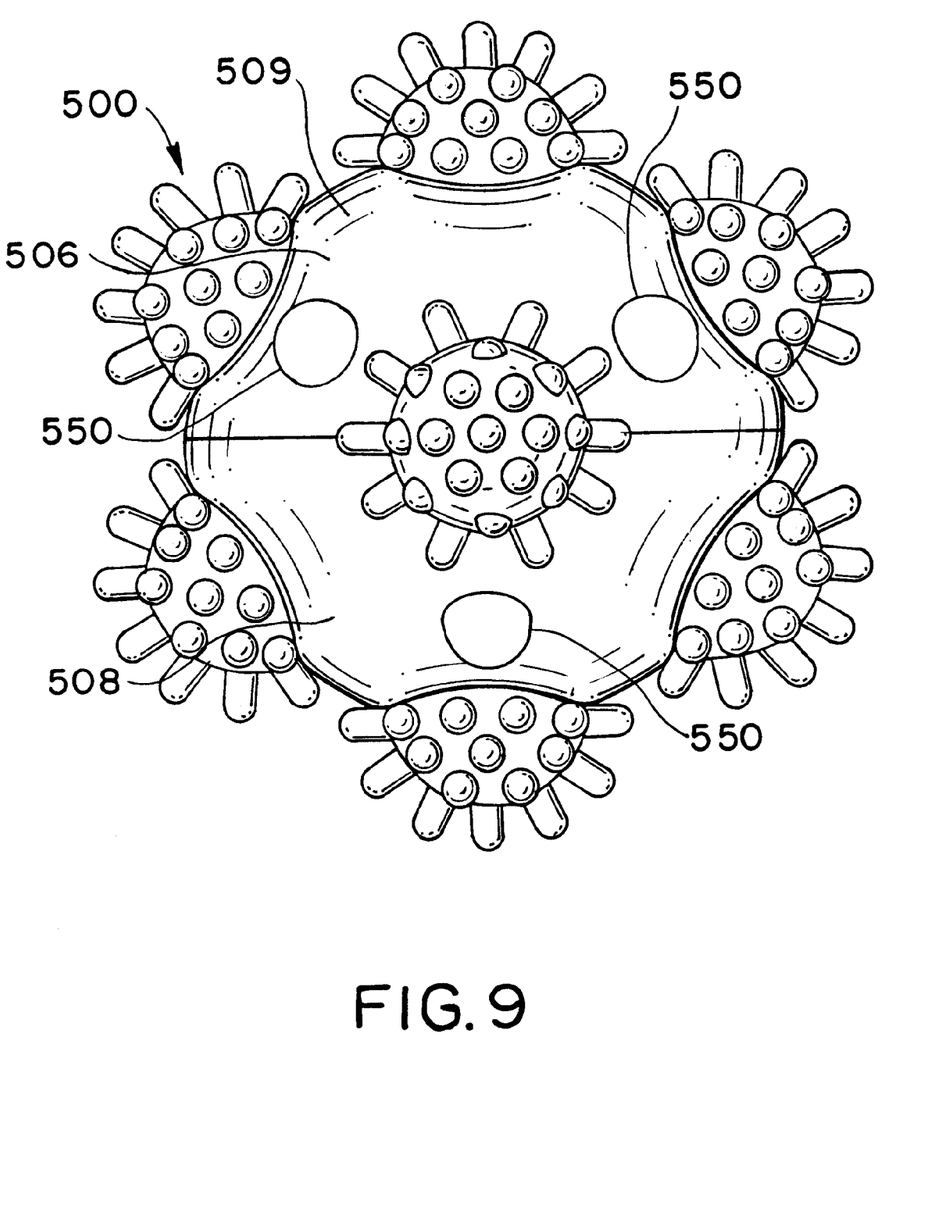
FIG. 9 is an elevational view of the chew toy in accordance with an embodiment of the invention having at least three hemispheres molded onto each half of the chew toy.

Referring now to FIG. 9, hemispheres 550 are shown being formed onto the surface 509 of the frame 502. In a preferred embodiment, at least one, and more preferably three hemispheres 550 are molded onto the surface 509 of the frame 502. Also, more than three hemispheres may be provided. The hemispheres 550 are meant to increase the overall chewing pleasure of the chew toy 500. The combination of the hemispheres 550 and the chew portions 530 are believed to better simulate the sensation of chewing meat on bone.

Furthermore, the spherical shape of the frame 502 allows the chew toy 500 to be used as a ball in games of fetch. Because the chew portions 530 add irregularity to the overall shape of the chew toy 500, the toy 500 will often bounce unpredictably. This unpredictability can add to the dog's enjoyment and exercise.

Figure 7A:
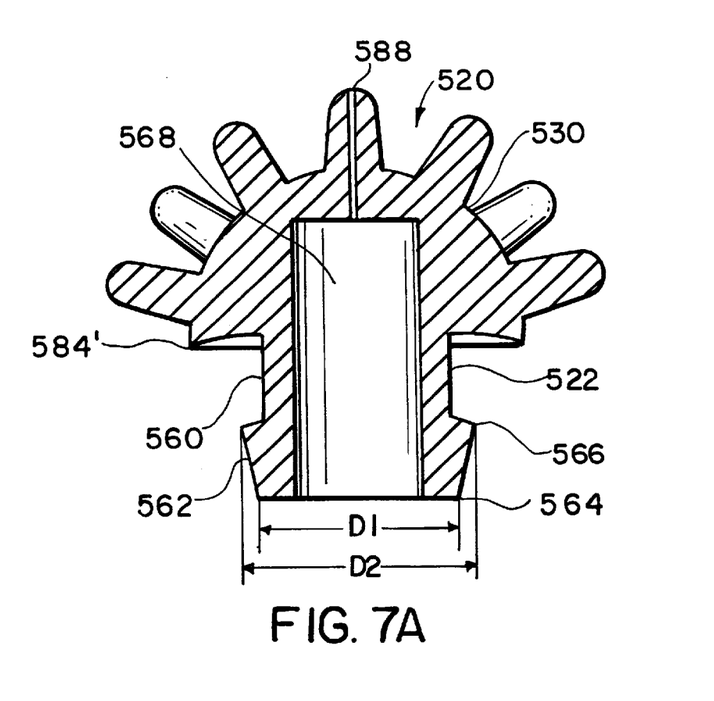
FIG. 7A is a cross-sectional view of a variation of the stud for use with the chew toy of FIG. 5.

In an alternative embodiment, shown in FIG. 10, frame 502 while being substantially spherical, has the plurality of flat portions 580, on the surface 509, encircling each of the apertures 504. On the frame 502, each aperture 504 is disposed such that it is centered in a respective flat portion 580. The flat portions 580 facilitate the retention of the studs 520 in a stable position with relatively little movement as the flat bottom 584 of the chew portion 530 of *he stud 520 is abutted against the flat portion 580, when the stud 520 is inserted in the aperture 504, in substantially full face-to-face contact. Such contact reduces the possibility of the studs 520 rocking and eventually loosening. Flat portions 580 need not be truly flat, however, but may be slightly rounded, with a radius of curvature greater (i.e. less curved) than that of frame 502 in general. With slightly rounded flat portions 580, or a truly spherical frame 502, studs 520 as shown in FIG. 7 would not abut the slightly rounded flat portions 580 or the frame surface 509 in full face-to-face contact, but rather, would abut with limited area or point contacts. For this reason, if frame 502, in an alternative embodiment, is formed with slightly rounded flat portions 508, or to be truly spherical, without flat portions 580, the studs 520 should be formed with chew portions 530 having curved bottoms 584' with a curved shape, as shown in FIG. 7A, that preferably generally matches the shape of the surface 509, with or without slightly rounded flat portions 580, or other shapes (although not shown). The curved shape of the curved bottom 584' facilitates a stable abutment of the stud 520 against the curved, truly spherical frame 502, or frame with slightly curved flat portions 580. Also, each aperture 504, may have a chamfered edge 582, that also facilitates the insertion and stable retention of the studs.

As can also be seen in FIG. 10, an aroma insert 586 may be disposed in the interior volume 570 by passing it through one of the apertures 504 prior to insertion of the studs 520. Alternatively, aroma insert 586 may be placed in one of the halves 506, 508 prior to, sealing the halves 506, 508 together. Aroma insert 586 may be formed from a porous or spongy material, or any material known in the art that will retain an aroma. Prior (or after) to disposal in the frame 502, the aroma insert 586 is saturated, such as by dipping or injection filling with a flavor or aroma additive such as bacon or other aromas that can be pleasing to pets, and dogs in particular. The aroma migrates from the interior volume 570 and enters the ambient atmosphere 572 and adds to the enjoyment of pets. The passage of the aroma from the interior volume 570 to ambient environment 572 is facilitated by the frame 502 being made of a material, such as nylon, that facilitates passage of aromas through its structure. Also, the studs 520, may be formed with a small hole or channel 588 or 588', (see FIGS. 7 and 7A) to further facilitate the emission of the aroma into ambient environment 572. Alternatively, scent and flavor additives can be compounded with the material for forming frame 502 or studs 520 before they are molded, as was discussed above with respect to frame 200 and soft portion 300.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A pet chew toy, comprising:
a body sized, configured and formed of appropriate materials to function as a pet chew toy, the body comprising a frame portion having a first rigidity and a first hardness, a chew portion mounted on the frame portion, the chew portion having a second rigidity substantially less rigid than that of the first rigidity and a second hardness substantially less hard than that of the first hardness, the frame portion housing an insert containing a scent emitting material and the frame portion and the chew portions having passages therethrough to place the insert in fluid communication with the ambient atmosphere around the exterior of the toy, the passages sized and constructed and the insert located in the frame to prevent physical contact with the insert when the body is handled.

2. The chew toy of claim 1, wherein the frame includes a container housing the insert, the container having at least one opening therein aligned with an opening through the chew portion through which scent from the insert can be emitted.

3. The chew toy of claim 1, wherein the frame portion has a Shore D hardness of about 70 or more.

4. The chew toy of claim 1, wherein the chew portion has a Shore A hardness of about 90 or less.

5. The chew toy of claim 1, wherein the chew portion has a Shore A hardness of about 90 or less and the frame portion has a Shore D hardness greater than about 70.

6. The chew toy of claim 1, wherein the frame portion has a first end and a second end and a middle portion extending from the first end to the second end and the chew portion is mounted on the middle portion between the first and the second ends, with portions of the frame exposed.

7. The chew toy of claim 1, wherein the frame has a top side and a bottom side and the chew portion comprises two curved domes, one on each of said sides of the frame, with portions of the frame exposed between the two domes.

8. The chew toy of claim 1, wherein the frame comprises nylon.

9. The chew toy of claim 1, wherein the soft portion comprises polyurethane.

10. The chew toy of claim 1, wherein the body is constructed to have an appearance resembling a bone.

11. The chew toy of claim 1, wherein a plurality of studs are mounted on and supported by the frame.

12. The chew toy of claim 1, wherein the frame defines an interior volume separated from an ambient atmosphere and the frame comprises a plurality of apertures.

13. The chew toy of claim 12, wherein a plurality of studs are disposed in said plurality of apertures, such that a portion of each stud is disposed in said interior volume, and a portion of each stud is disposed in said ambient atmosphere and at least one of the studs includes a through hole so that the insert is in fluid communication with the ambient atmosphere through the aperture and through hole.

14. The chew toy of claim 13, wherein the frame has a generally spherical shape and a plurality of substantially flattened portions are formed on said frame, said plurality of flattened portions encircling said plurality of apertures, said flattened portions facilitating stable retention of said plurality of studs in said plurality of apertures.

15. The chew toy of claim 14, wherein said plurality of studs each have a portion thereof in substantially fall face-to-face contact with a portion of said frame.

16. The chew toy of claim 1, wherein the scent emitting material emits a food scent.

17. A method of forming a pet chew toy, comprising:
   forming a frame of a relatively hard and rigid material, including at least one scent passageway; mounting a chew portion of a relatively soft and flexible material on the frame, the chew portion including a second scent passageway, and housing at least one scent insert body, containing scent emitting material, in fluid communication with the passageways in the frame and chew portion, within the frame.

18. The method of claim 17, wherein the insert is housed in the frame before the chew portion is mounted on the frame, the scent emitting material is liquid and after the chew portion is mounted on the frame, the scent emitting material is injected, through the chew portion and through the frame, into the insert.

19. The method of claim 17, wherein the scent emitting material and insert are combined and the combination is housed in the frame before the chew portion is completely mounted on the frame.

20. The method of claim 19, wherein the insert is dipped into scented material before it is housed in the frame.

21. The method of claim 17, wherein the frame and chew portion are formed with multiple passageways to place the insert within the frame in fluid communication with the ambient atmosphere.

22. The method of claim 17, wherein the passageways are sized and constructed to prevent the insert from being contacted when the chew toy is handled.

* * * * *